United States Patent [19]

Runavot et al.

[11] 4,360,628
[45] Nov. 23, 1982

[54] COPOLYMER TACKIFYING RESINS CONTAINING DICYCLOPENTADIENE, VINYL AROMATIC HYDROCARBON AND A SUBSTITUTED BENZENE (HALOGEN, LOWER ALKYL, OR HYDROXYL) AND ADHESIVES CONTAINING THESE RESINS

[75] Inventors: Yves Runavot, St. Maur des Fosses; Georges Billault, Saint Ouen; Jacques Salvetat, Le Vésinet, all of France

[73] Assignee: National Starch and Chemical Corporation, Bridgewater, N.J.

[21] Appl. No.: 226,564

[22] Filed: Jan. 19, 1981

Related U.S. Application Data

[63] Continuation-in-part of Ser. No. 167,494, Jul. 11, 1980.

[30] Foreign Application Priority Data

Jul. 17, 1979 [NL] Netherlands ............................ 7905548

[51] Int. Cl.$^3$ ........................ C08L 45/00; C08L 55/00; C08K 5/01; C08L 91/06
[52] U.S. Cl. ................................. 524/508; 524/487; 524/488; 525/99; 525/102; 525/112; 525/149; 525/152; 525/185; 525/190; 525/216; 526/237; 526/283; 526/290; 528/205; 528/392
[58] Field of Search .................... 526/237, 283, 290; 260/4 AR, 5, 28.5 AV, 28.5 B; 525/99, 102, 112, 149, 152, 216, 185, 190; 528/205; 524/518, 487, 488, 508

[56] References Cited

U.S. PATENT DOCUMENTS

| | | | |
|---|---|---|---|
| 3,299,170 | 1/1967 | Gonzenbach | 526/237 |
| 3,459,699 | 8/1969 | Levine et al. | 260/29.7 |
| 3,640,977 | 2/1972 | Gonzenbach | 526/283 |
| 3,745,054 | 7/1973 | Smedberg | 524/488 |
| 3,784,530 | 1/1974 | Osborn et al. | 260/5 |
| 3,839,243 | 10/1974 | Ruckel et al. | 524/518 |
| 3,846,352 | 11/1974 | Bullard et al. | 524/518 |
| 3,993,626 | 11/1976 | Lavrito | 528/205 |
| 4,032,486 | 6/1977 | Gobran | 260/4 AR |
| 4,039,724 | 8/1977 | Gobran | 260/5 |
| 4,045,398 | 8/1977 | Dahms | 526/237 |
| 4,046,838 | 9/1977 | Feeney | 526/290 |
| 4,102,834 | 7/1978 | Morimoto et al. | 526/283 |
| 4,105,610 | 8/1978 | Jung et al. | 525/149 |
| 4,126,739 | 11/1978 | Hoene et al. | 526/283 |
| 4,129,557 | 12/1978 | Kudo et al. | 526/283 |
| 4,179,550 | 12/1979 | Miyamoto et al. | 526/237 |
| 4,189,410 | 2/1980 | Laurito | 526/290 |
| 4,189,548 | 2/1980 | Sakashita et al. | 526/237 |
| 4,205,145 | 5/1980 | Tsuchiya et al. | 260/DIG. 38 |

FOREIGN PATENT DOCUMENTS 2262158 7/1973 Fed. Rep. of Germany ...... 526/283
1548094 7/1979 United Kingdom .

OTHER PUBLICATIONS

Derwent Abst. 07385 U/06 (NL7209829-Q) "Unsat. Resin Prod. . . ." Jan. 23, 1973, Reichhold-Albert Chemie.
Derwent Abst. 18102 V/10 (J48022538) "Hot Melt Adhesives cont. DCPD-Phenol Adducts" 031973 Arakawa Forest.

Primary Examiner—John C. Bleutge
Assistant Examiner—Herbert J. Lilling
Attorney, Agent, or Firm—Edwin M. Szala; Ellen T. Dec

[57] ABSTRACT

Solid copolymer tackifying resins based on dicyclopentadiene, a vinylaromatic hydrocarbon and a benzene carrying 1 to 3 lower alkyl, hydroxyl or halogen substituents and adhesive formulations containing these resins.

10 Claims, No Drawings

COPOLYMER TACKIFYING RESINS CONTAINING DICYCLOPENTADINE, VINYL AROMATIC HYDROCARBON AND A SUBSTITUTED BENZENE (HALOGEN, LOWER ALKYL, OR HYDROXYL) AND ADHESIVES CONTAINING THESE RESINS

This application is a continuation-in-part of Ser. No. 167,494, filed July 11, 1980.

The invention relates to solid copolymer tackifying resins containing dicyclopentadiene, a vinylaromatic hydrocarbon, and a substituted benzene, and to adhesive formulations containing these resins.

Solid copolymer tackifying resins containing dicyclopentadiene (often abbreviated to dcpd) and vinylaromatic hydrocarbons are known from U.S. Pat. No. 3,640,977. These resins contain 55–75% of vinyltoluene, 5–20% of alpha-methylstyrene, 1–25% of dicyclopentadiene and 0–15% of an acrylic compound being (meth)acrylic acid or an alkylester thereof. These tackifying resins are useful for adhesives and hot melt compositions. However, the performance of these tackyfying resins in adhesives is not quite satisfactory. It has now been found that the balance of adhesive properties, in particular compatibility and shear adhesion, is improved if dicyclopentadiene and a vinylaromatic compound are present in the resin in a molar ratio of 1:05.–2.4, better products being obtained in the range from 1:0.7–2 and ranges from 1:1–1.5 being particularly preferred.

It is known from U.S. Pat. No. 4,189,548 to prepare epoxy resin compositions comprising a polyepoxy compound, a curing agent and a hydrocarbon resin which may be based on dicyclopentadiene and a vinylaromatic compound containing 8–10 carbon atoms.

Dicyclopentadiene can be used as the pure chemical compound, but it is often advantageous to use a dicyclopentadiene concentrate or technical grade containing 60% or rather 80% by weight or more of the compound.

The vinylaromatic compound in the resin can be e.g. styrene, a methyl-styrene or a vinyltoluene, but styrene is preferred.

Again the pure compound can be used but technical grades or concentrates containing at least 60% or rather 80% by weight of one or more vinylaromatic compounds can be used with practical advantage.

Resins having a better compatibility with ethylene vinyl acetate copolymer are obtained if the copolymer tackifying resin is "alkylated," i.e. by incorporation into the resin of mono-, di- or trisubstituted benzene in which the substituents are chosen among lower alkyl ($C_1$–$C_{12}$), hydroxyl and halogen. The amount of alkyl, hydroxy or halogenobenzene in the resin varies from 0.01–1.0, preferably 0.03–0.6 mole of substituted benzene per mole of dicyclopentadiene. Phenols are preferred "alkylating" agents, in particular phenol itself and alkylated phenols, in which the alkyl group contains 1–12, in particular 5–12 carbon atoms. The use of phenol and octyl phenol in combination leads to optimal compatibility. Preferably the amount of alkylating agent in the resin and its average molecular weight are such that between 0.5 and 1.5, preferably 0.8 to 1.2 moles of alkylating agent are present per average molecule of the resin, so that the majority of the resin molecules are believed to contain one alkyl group. The average molecular weight of the resins according to the present invention ranges between 600 and 1000 and preferably lies below 800.

However, the alkylating agent may be present in the reaction mixture in higher molar ratios than indicated above and partly act as a solvent, which is distilled off after termination of the reaction.

It is also preferred that the tackifying resin contains a pentadiene, preferably piperylene, i.e. 1,3-pentadiene (cis and trans). Resins containing pentadiene, in particular piperylene, are preferred because pentadiene confers a better tack, particularly with respect to polyester and polyolefin substrates, and a better compatibility to the resin. Again pure piperylene can be used, but usually technical grade pentadiene or piperylene concentrates containing more than 45% of pure pentadienes can be used, provided they contain less than 5% of isoprene, the remainder being monoenes, dicyclopentadiene methyl cyclopentadiene and non-polymerisable products.

The amount of pentadiene in the tackifying resin ranges from 1 to 3 moles per mole of dicyclopentadiene, preferably from 1:0.5–2.

Tackifying resins having a paler colour and/or optionally a better solubility are those also containing 0.01 to 0.25 mole of an unsaturated ester per mole of dicyclopentadiene. $C_1$–$C_{12}$-Alkyl esters of unsaturated carboxylic acids, in particular alpha-beta-unsaturated acids, such as acrylic acid and methacrylic acid, are preferred. For example, 2-ethyl-hexyl esters of acrylic and methacryl acid have been used, but hexyl and decyl esters can equally be used.

Consequently, the present invention provides copolymers essentially consisting of dicyclopentadiene, a vinylaromatic compound, a substituted benzene and optionally a pentadiene or an unsaturated ester in the quantities indicated above.

The solid copolymer tackifying resins according to the present invention can be prepared optionally in the presence of a solvent, e.g. methylcyclohexane and a minor amount, e.g. 0.2–5%, based on monomers, of a Friedel Crafts catalyst, such as $BF_3$ or complexes thereof (both are preferred), $AlCl_3$, or $TiCl_4$, at temperatures from 0°–80° C., preferably 20°–50° C., after which the catalyst is neutralized with alkali or alkaline earth hydroxide, eliminated, and volatiles are stripped off.

As the reaction is exothermic, tight control of the reaction rate is necessary. Several methods for carrying out the reaction therefore proved to be practicable:

(A) Part of the solvent is used to dissolve alkylating agent (e.g. phenol)+catalyst and a blend of monomers with the remainder of the solvent is then added gradually.

(B) Monomers, alkylating agent and solvent are blended and the catalyst is slowly added.

(C) Monomers, solvent and alkylating agent are continuously added to the reactor, simultaneously with the catalyst.

The tackifying resin thus obtained is a light-coloured solid with a softening point (Ring+Ball) of 70°–160° C. (ASTM E28) and is useful for adhesive formulations, in particular in adhesives when used in combination with ethylene vinylacetate copolymers, optionally together with a microcrystalline wax or paraffin wax. The compatibility differs from one tackifying resin to another and depends also on the type of ethylene vinylacetate copolymer used, particularly of the percentage of vinylacetate contained therein, but in some instances good compatibility resulting in clear or opalescent mixtures with a low cloud pount is obtained.

The present invention thus also provides mixtures containing 10-75%, preferably 20-50% by weight of a copolymer tackifying resin as described above and ethylene vinylacetate copolymer and optionally a microcrystalline or paraffin wax, which mixtures are usually obtained by melting the resin and wax and any optional further constituents such as anti-oxidants, stabilizers and fillers.

The copolymer tackifying resins described above are also useful for pressure-sensitive adhesives, in particular those containing pentadiene, for which purpose such a hydrocarbon resin is mixed with a natural or synthetic rubber and optionally an organic solvent. For hot-melt pressure-sensitive adhesives instead of a solvent a tackifying oil is used with or without ethylene copolymers. Here too, the amount of copolymer tackifying resin is 10-75, preferably 20-50% by weight of the total composition.

The balance of properties of these pressure-sensitive adhesives, such as peel adhesion or peel strength (determined according to PSTC-1), tack (determined according to PSTC-6 (modified) and shear adhesion (determined according to PSTC-7) is better than that of the adhesives based on tackifying resins known in the art.

The invention is illustrated by the following Examples:

EXAMPLE 1

30 parts of dicyclopentadiene (85% purity), 21 parts of styrene (molar ratio 1:1) and 75 parts of xylene were reacted with 1% boron trifluoride diether complex for 4 hours at 30° C. Subsequently the mixture was neutralized with ammonia and filtered, and volatiles, including free dicyclopentadiene, were stripped off. The tackifying resin was obtained in a 82% yield; softening point 118° C.

EXAMPLE 2

30 parts of dicyclopentadiene (85% purity), 21 parts of styrene (molar ratio 1:1) and 75 parts of a solvent mixture consisting for 99% of aromatic hydrocarbons (boiling point 158°-171° C. and mainly consisting of alkylbenzenes) (Solvesso 100, ex Esso Oil, N.J., USA), were reacted in the presence of 0.5% boron trifluoride at 45° C. The yield of tackifying resin (softening point 76° C.) was 107%, calculated on dicyclopentadiene and styrene together. The tackifying resin showed an excellent compatibility with ethylene vinyl acetate copolymers.

EXAMPLE 3

20 parts of dicyclopentadiene (85% purity), 21 parts of styrene (molar ratio 1:1.5), and 75 parts of a mixture of trimethylbenzenes and minor quantities of lower monoalkyl benzenes were reacted in the presence of 0.4% of boron trifluoride at 40°-45° C. The resin was obtained in a 100% yield, calculated on dcpd and styrene, indicating minor incorporation of alkyl groups in the tackifying resin, and showed a softening point of 98.5° C. The average molecular weight was 625. The compatibility with ethylene vinyl acetate copolymer was excellent.

EXAMPLE 4

30 parts of dicyclopentadiene (85% purity), 21 parts of styrene (molar ratio 1:1), 1 part of phenol, 20 parts of pseudocumene and 55 parts of xylene were reacted at 40°-45° C. in the presence of 0.5% of boron trifluoride and subsequently held at 70° C. for 4 hours. A tackifying resin was obtained in a 92% yield, having a softening point of 125° C.

EXAMPLE 5

30 parts of dicyclopentadiene (85% purity), 21 parts of styrene (molar ratio 1:1), 5 parts of nonylphenol, 20 parts of pseudocumene and 55 parts of xylene were reacted at 40°-45° C. in the presence of 1% boron trifluoride diether complex and subsequently held for 4 hours at 70° C. A tackifying resin was obtained in a 91% yield, having a softening point of 112° C., which resin was compatible with ethylene vinyl acetate copolymers.

EXAMPLE 6

30 parts of dicyclopentadiene (85% purity), 21 parts of styrene (molar ratio 1:1), 5 parts of nonylphenol and 55 parts of xylene were reacted at 75° C. for 4 hours in the presence of 1% boron trifluoride diether complex. The tackifying resin was obtained in a 91.1% yield; softening point 106° C. The compatibility with ethylene vinyl acetate was good.

EXAMPLE 7

30 parts of dicyclopentadiene (85% purity), 21 parts of styrene (molar ratio 1:1), 5.2 parts of phenol (0.3 mole per mole of dcd), 10.5 parts of octylphenol, 2 parts of 2-ethyl hexylacrylate in 60 parts of methylcyclohexane were reacted in the presence of 0.5% of borontrifluoride catalyst at a reaction temperature of 40°-45° C. The tackifying resin was obtained in a 92% yield, Gardner colour 10+, softening point 90° C., and showed an excellent compatibility with ethylene vinyl acetate and had a good adhesion. The tackifying resin was completely soluble in light petroleum.

EXAMPLE 8

30 parts of dicylopentadiene (85% purity), 21 parts of styrene (molar ratio 1:1), 5.2 parts of phenol (0.3 mole per mole of dcpd), 5.2 parts of octylphenol (0.15 mole per mole of dcpd) and 1 part of 2-ethylhexylacrylate were reacted in 60 parts of methylcyclohexane for 4 hours at 40°-45° C. in the presence of 0.5% of boron trifluoride. A tackifying resin was obtained in a 96% yield, Gardner colour 13, softening point 109° C., having a good compatability with ethylene vinyl acetate copolymer.

EXAMPLE 9

30 parts of dicyclopentadiene (85% purity), 21 parts of styrene (molar ratio 1:1), 6.5 parts of phenol (0.35 mole per mole of dcpd), 3.5 parts of octylphenol (0.08 mole per mole of dcpd), 1.5 parts of 2-ethyl hexylacrylate, and 30 parts of methylcyclohexane as a solvent are polymerized at 25°-35° C., using 0.5% of boron trifluoride as a catalyst. The catalyst is added in 3 hours, holding the reaction temperature in the indicated range and subsequently the mixture is held at 30° C. for 3 hours. The catalyst is neutralized by adding sufficient calcium hydroxide, the mixture is filtered and volatiles (solvents and remaining monomers) are distilled off. The tackifying resin obtained is hard and yellowish, having a Gardner colour below 8, and has a softening point at 100° C. Average molecular weight 790. Yield 95%.

A hot-melt adhesive is prepared by melting equal parts of this tackifying resin with an ethylene vinyl acetate copolymer containing the percentages of acetate indicated below. The adhesive was evaluated and the following results were obtained:
Shear strength (Zwick dynamometer).
Resin: ethylene vinyl acetate.
1:1 24 kg/cm$^2$ (32% vinyl acetate)
2:1 50 kg/cm$^2$ (32% vinyl acetate)
1:1 24 kg/cm$^2$ (28% vinyl acetate)
2:1 40 kg/cm$^2$ (28% vinyl acetate
1:1 32 kg/cm$^2$ (18% vinyl acetate)
2:1 36 kg/cm$^2$ (18% vinyl acetate).

EXAMPLE 10

30 parts of dicyclopentadiene (85% purity), 21 parts of styrene (molar ratio 1:1 to dcpd), 2.5 parts of phenol (0.14 mole per mole of dcpd), 5.2 parts of octylphenol (0.13 mole per mole of dcpd), 1.5 parts of 2-ethyl hexylacrylate (0.04 mole per mole of dcpd), 24 parts of piperylene concentrate (1.5 moles per mole of dcpd) (85% purity), and 30 parts of methyl cyclohexane as a solvent were polymerized at 25°-35° C., using 0.5% borontrifluoride as a catalyst, following the procedure of Example 9. The tackifying resin was hard and yellowish (Gardner colour 8) and had a softening point of 82° C. Yield 90%. Average molecular weight 800. A pressure-sensitive adhesive was prepared by mixing copolymer tackifying resin and natural rubber (50:50) together with 65 parts by weight of a hydrocarbon solvent.

The adhesive was deposited on a polyester film. The properties of the adhesive are indicated below.
Peel adhesion 180° in 475 grams per cm of ribbon. Tack (=4 cm PSTC-6 modified rolling ball) improving upon ageing.
Shear adhesion (according to PSTC-7 method): more than 24 hours (surface 2×2.5 cm$^2$; 1 kg).

We claim:

1. Adhesive composition, essentially consisting of a tackifying resin, an adhesive base selected from the group consisting of ethylene vinyl-acetate copolymers, natural and synthetic rubbers, as well as optionally a wax or paraffin, in which the tackifying resin is a copolymer consisting essentially of dicyclopentadiene, a vinylaromatic hydrocarbon, a mono-, di- or tri-substituted benzene in which the substituents are chosen among lower alkyl, hydroxyl and halogen, and optionally a pentadiene and a C$_1$-C$_{12}$ alkyl ester of an unsaturated carboxylic acid, in relative molar ratios of 0.7-1.5 moles of vinylaromatic compound per mole of dicyclopentadiene and 0.01-1.0 mole of substituted benzene per mole of dicyclopentadiene and 0-3 moles of pentadiene and 0-025 moles of C$_1$-C$_{12}$ alkyl ester of unsaturated carboxylic acid per mole of dicyclopentadiene.

2. Pressure-sensitive adhesive according to claim 1, in which 20-50% by weight of the total adhesive compositon is the tackifying resin and which composition also comprises a natural or synthetic rubber.

3. Hot-melt adhesive according to claim 1, in which 20-50% by weight of the total composition is the tackifying resin and which composition comprises an ethylene vinyl-acetate copolymer, optionally together with a wax or paraffin.

4. An adhesive according to claim 1, wherein the vinylaromatic hydrocarbon in the tackifying resin is styrene.

5. An adhesive according to claim 1, in which the substituted benzene in the tackifying resin comprises phenol.

6. An adhesive according to claim 5, in which the substituted benzene in the tackifying resin comprises an alkylated phenol.

7. An adhesive according to claim 1, also comprising in the tackifying resin a pentadiene in a molar ratio to dicyclopentadiene from 1:0.5-2.

8. An adhesive according to claim 7, in which the pentadiene is a piperylene.

9. An adhesive according to claim 1, also comprising in the tackifying resin 0.01 to 0.25 mole of an unsaturated ester per mole of dicyclopentadiene.

10. An adhesive according to claim 9, in which the unsaturated ester is an acrylate ester.

* * * * *